United States Patent
Yamanishi et al.

(10) Patent No.: US 8,671,892 B2
(45) Date of Patent: Mar. 18, 2014

(54) RADIATOR COOLING STRUCTURE FOR WATER-COOLED POWER UNIT

(75) Inventors: Teruhide Yamanishi, Wako (JP); Nobutaka Horii, Wako (JP); Ryuji Tsuchiya, Wako (JP); Kiyotaka Iizuka, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/393,025

(22) PCT Filed: Sep. 3, 2009

(86) PCT No.: PCT/JP2009/065406
§ 371 (c)(1),
(2), (4) Date: May 15, 2012

(87) PCT Pub. No.: WO2011/027446
PCT Pub. Date: Mar. 10, 2011

(65) Prior Publication Data
US 2012/0216984 A1 Aug. 30, 2012

(51) Int. Cl.
*F01P 9/00* (2006.01)
(52) U.S. Cl.
USPC ...................................... 123/41.01
(58) Field of Classification Search
USPC ...................................... 123/41.01
See application file for complete search history.

(56) References Cited

U.S. PATENT DOCUMENTS

| | | | | |
|---|---|---|---|---|
| 5,715,904 | A * | 2/1998 | Takahashi et al. | 180/229 |
| 6,971,438 | B2 * | 12/2005 | Oki et al. | 165/41 |
| 7,143,854 | B2 * | 12/2006 | Arnold | 180/229 |
| 7,422,081 | B2 * | 9/2008 | Dufresne et al. | 180/68.1 |

FOREIGN PATENT DOCUMENTS

| | | |
|---|---|---|
| JP | 63-7026 | 1/1988 |
| JP | 63-139025 | 9/1988 |
| JP | 07-187041 A | 7/1995 |
| JP | 2002-201938 A | 7/2002 |

OTHER PUBLICATIONS

International Search Report corresponding to International Application No. PCT/JP2009/065406 dated Nov. 10, 2009 and English translation thereof.

* cited by examiner

*Primary Examiner* — Lindsay Low
*Assistant Examiner* — Charles Brauch
(74) *Attorney, Agent, or Firm* — Squire Sanders (US) LLP (57) ABSTRACT

Disclosed is a radiator cooling structure for cooling a radiator of a water-cooled power unit mounted on a small vehicle and disposed on a laterally outer side of the small vehicle, which radiator cooling structure improves the efficiency of cooling an internal combustion engine by using a head wind. The radiator is provided with a radiator cover having a louver for guiding cooling air to the radiator. The louver is formed such that a rear part thereof is more protruded laterally outward than a front part thereof. The louver of the radiator cover has parallel slats tilting forward, and a lower body cover is provided with a cooling air intake opening capable of guiding a head wind toward the louver positioned obliquely above and rearward of the cooling air intake opening.

12 Claims, 11 Drawing Sheets

RADIATOR COOLING STRUCTURE FOR WATER-COOLED POWER UNIT

TECHNICAL FIELD

The present invention relates to a radiator cooling structure for a water-cooled power unit mounted on a small vehicle.

BACKGROUND ART

A conventional radiator cooling structure for a water-cooled power unit mounted on a small vehicle has a radiator and a radiator cover, which are disposed parallel to the longitudinal axis of the body of the small vehicle. Therefore, the radiator cooling structure is unable to use a headwind effectively to improve the cooling efficiency of the radiator (see Patent Document 1, for example).

PRIOR ART LITERATURE

Patent Literature

Patent Literature 1: JP 2002-201938 A

SUMMARY OF THE INVENTION

Technical Problem

The present invention is intended to improve the efficiency of cooling an internal combustion engine by effectively using a head wind.

Solution to the Problem

The present invention provides a radiator cooling structure for a water-cooled power unit of a small vehicle wherein a radiator is disposed on a laterally outer side of the small vehicle, characterized in that the radiator is provided with a radiator cover having a louver for guiding cooling air to the radiator, and the louver is formed such that a rear part thereof with respect to vehicle running direction is more protruded laterally outward of the vehicle relative than a front part thereof.

In a preferred form of the present invention, the louver of the radiator cover has parallel slats tilted forward, and there is provided a lower body cover formed with a cooling air intake opening for guiding a head wind toward the louver, which is positioned obliquely above and rearward of the cooling air intake opening.

In a preferred form of the present invention, the louver is disposed on an inner side of a member of the body, with respect to the width of the vehicle.

In a preferred form of the present invention, the member of the body includes a pillion footstep and a stay for the pillion footstep.

In a preferred form of the present invention, the member of the body includes a reinforced part formed in a rear edge of the body cover to support a heel support thereon.

In a preferred form of the present invention, a rear part of a space extending between the radiator and the radiator cover is wider than a front part of the space, and the rear part of the space is formed as an air flow changing space.

In a preferred form of the present invention, sealing members are arranged on an inner surface of the radiator cover so as to surround a radiator core of the radiator.

In a preferred form of the present invention, the radiator is disposed beside an end of a crankshaft of an internal combustion engine on a front side of an oil filler neck of a crankcase, for filling oil into the crankcase, upper and lower water tanks are joined, respectively, to upper and lower ends of the radiator, and the radiator is tilted forward as viewed in a lateral direction.

In a preferred form of the present invention, the radiator has a water filler neck formed integrally with an upper water tank, and the radiator cover has a water filler neck protecting part covering a side surface of the water filler neck and positioned on an inner side of a pillion footstep.

In a preferred form of the present invention, the radiator and the radiator cover are formed in vertically long shapes, respectively, and a cooling water inlet joint is formed integrally with an upper end of the upper water tank so as to extend forward.

Advantageous Effect of the Invention

The louver with the parallel slats thereof is formed such that a rear part thereof with respect to vehicle running direction is more protruded laterally outward of the vehicle than a front part thereof. Therefore, a headwind coming from the front of the vehicle can be efficiently guided to the radiator and hence cooling efficiency of cooling the internal combustion engine can be improved.

Cooling efficiency can be improved by the combined effect of the cooling air intake opening formed in the body cover, and the louver. The parallel slats of the louver are tilted forward such that the front edges of the slats are perpendicular to a head wind taken in through the cooling air intake opening to guide cooling air efficiently to the radiator.

The louver is protected by a high-strength member attached to the body.

The louver is protected from downward, external force that may be exerted on the louver by the pillion footstep and the stay for the pillion footstep.

The U-shaped rear edge of the body cover prevents the louver from being deformed by lateral force that may act on the louver.

Flow of a head wind gathered in a rear part of a space inside the radiator cover as the running speed increases can efficiently be deflected toward the radiator, which improves cooling efficiency during operation still further.

All air, whose pressure in the space on the inner side of the radiator cover increases as running speed increases, can be sent to the radiator and hence cooling efficiency during operation can be improved still further. Further, vibratory noise caused by a head wind passing through the louver can be reduced.

Although the oil filler neck is not covered with the body cover, the oil filler neck is protected by a rear part of the radiator cover. The radiator is tilted forward to provide a wide space over the oil filler neck and hence oil filling work is facilitated.

A water filler neck protector formed in the radiator cover prevents the pillion passenger's foot from moving toward the water filler neck. Therefore, any member specially for preventing the pillion passenger's foot from moving toward the water filler neck does not need to be placed on the inner side of the pillion footstep.

The radiator cover for guiding cooling air to the radiator is disposed with a rear part thereof more protruded laterally outward than a front part thereof. The radiator and the radiator cover are formed in vertically long shapes, respectively. Distance by which the rear end of the radiator cover having the vertically long shape protrudes laterally is less than that by which the rear end of the radiator cover having a long shape in the front-rear direction protrudes laterally.

The cooling water inlet joint connected to the upper end of the upper water tank projects forward. Therefore, all the radiator hoses can be arranged in a front space and hence sufficiently wide working spaces are available for the oil filler neck formed in the rear part of the crankcase and the water filler neck formed in the upper part of the radiator. Since the radiator has the vertically long shape and the water filler neck is connected to the upper part of the radiator, air can easily be removed from the water tank and the water filling work can be facilitated.

REFERENCE SIGN LIST

13 . . . Body cover, 13A . . . Lower body cover, 67 . . . Radiator, 68 . . . Radiator cover, 68a . . . Water filler neck protector, 69 . . . Louver, 69a . . . Slat, 70 . . . Cooling air intake opening, 71 . . . Oil filler neck, 72 . . . Oil filler cap, 73 . . . Upper water tank, 73a . . . Cooling water inlet joint, 74 . . . Lower water tank, 74a . . . Cooling water outlet joint, 75 . . . Radiator core, 76 . . . Water filler neck, 77 . . . Water filler cap, 91 . . . Pillion footstep, 93 . . . U-shaped high-strength part, 94 . . . Heel support, 95 . . . Air flow deflecting space, 96 . . . Sealing member

BEST MODE FOR CARRYING OUT THE INVENTION

Figure 1:
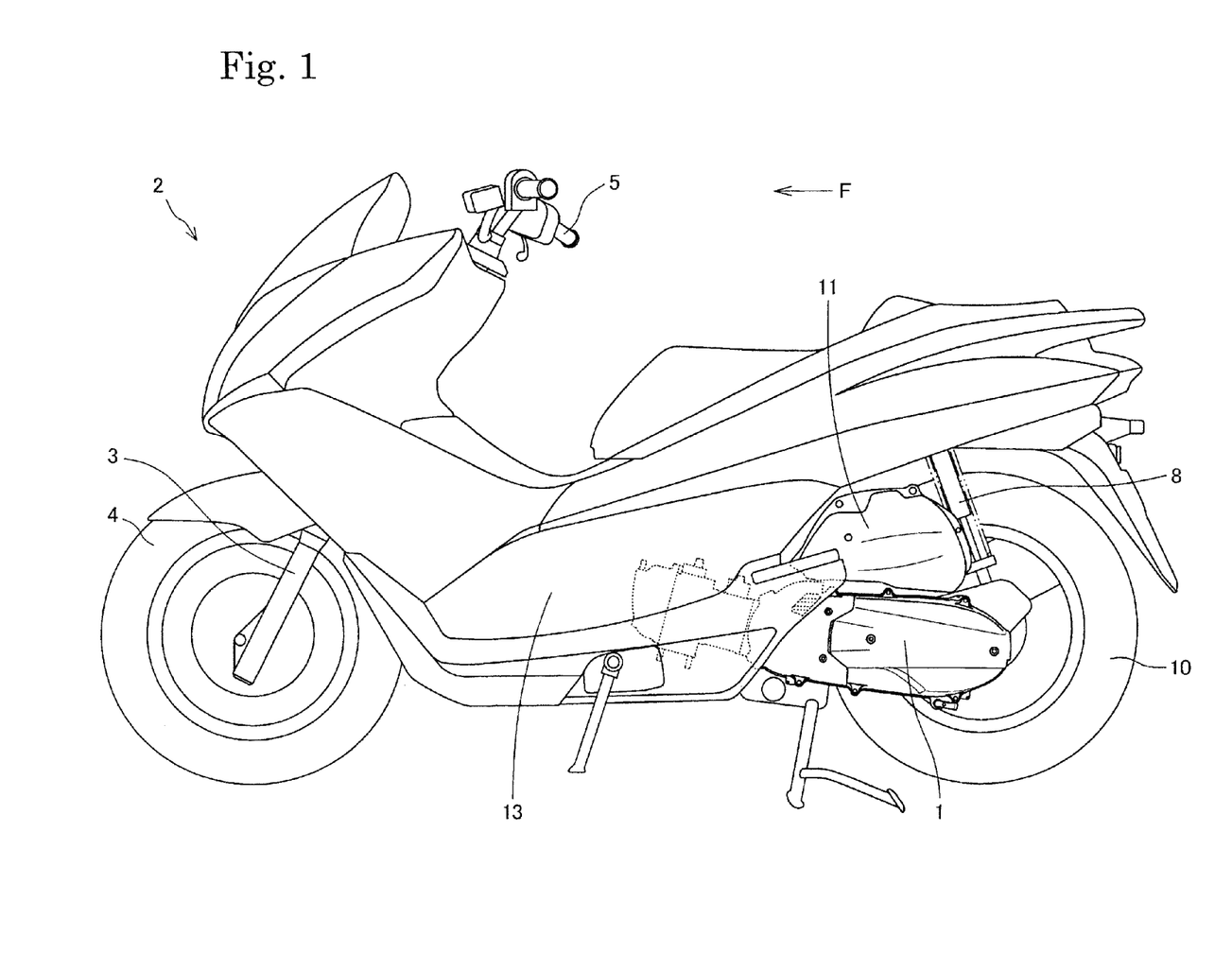
FIG. 1 is a left side elevation of a motorcycle 2 relating to a preferred embodiment of the present invention.

FIG. 1 is a left side elevation of a motorcycle 2 provided with a power unit 1 relating to a preferred embodiment of the present invention. The motorcycle 2 has a body frame formed by assembling a head pipe, a main frame extending obliquely downward toward the rear from the head pipe, right and left rear frames connected to the rear end of the main frame and extending obliquely upward toward the rear, and some frames. A front wheel 4 is rotationally supported on the lower end of a front fork 3 swingably supported on the head pipe. A handlebar 5 is connected to the upper end of the front fork 3.

The power unit 1 is suspended from the rear frame by connecting a hanger 6 (FIG. 2) formed integrally with a front part of the power unit 1 to a bracket fixed to the rear frame by a support shaft 7. A rear cushion 8 is extended between a bracket 14 (FIG. 2) formed in a part of the rear end of the power unit 1, and a bracket formed in a part of the rear end of the rear frame. Thus, the power unit 1 is suspended for swinging with the axis of its cylinder slightly inclined upward toward the front. A rear wheel 10 is mounted on a rear axle 9 (FIG. 3) extending to the right from a rear part of the power unit 1. The rear axle 9 is driven by the power unit 1.

An air cleaner 11 is disposed above the power unit 1. A body cover 13 made of a synthetic resin and consisting of a plurality of parts is attached to the body frame so as to cover the power unit 1 and other component parts.

Figure 2:
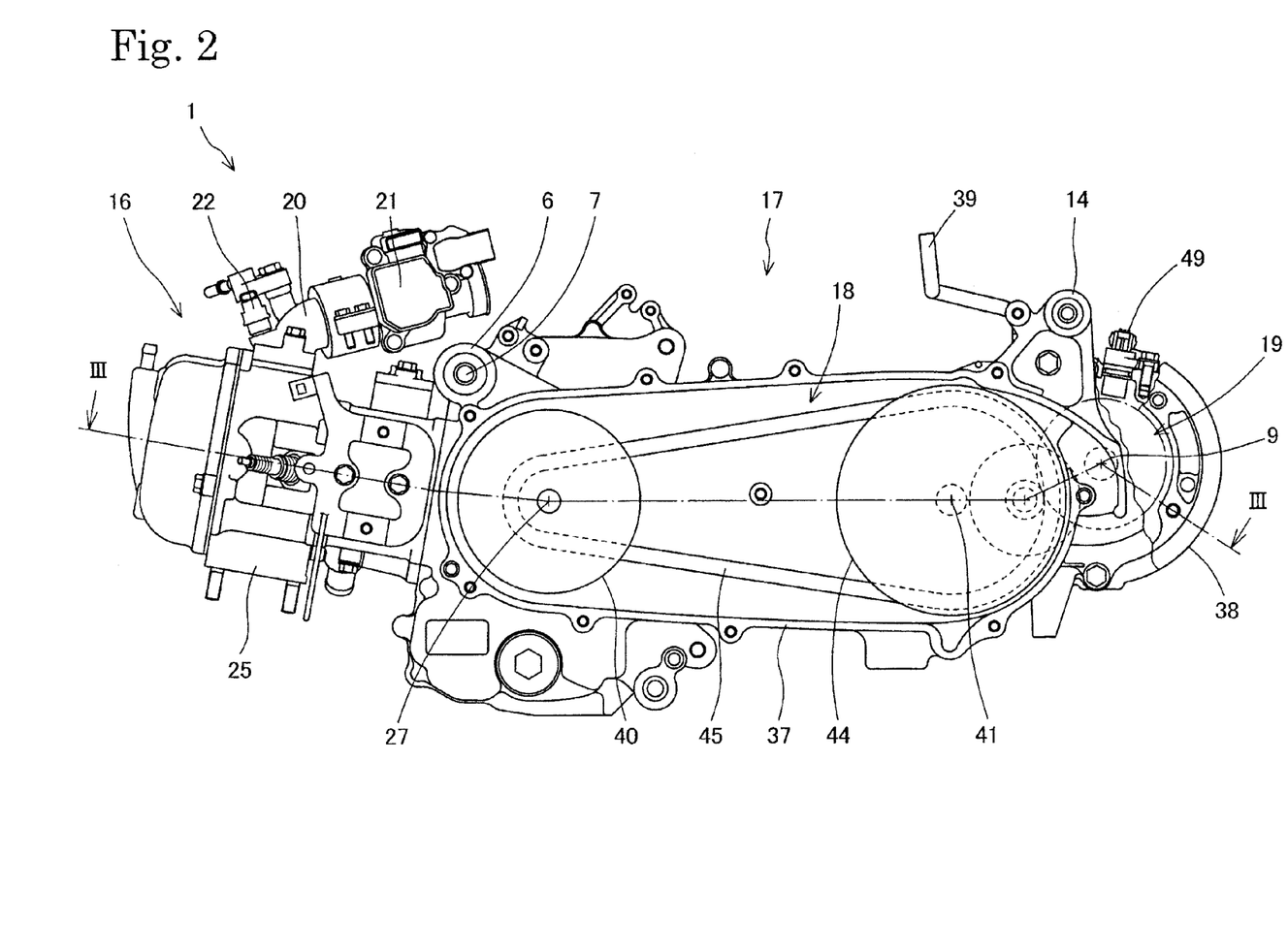
FIG. 2 is a vertical sectional view of a power unit 1 as viewed from the left side.

FIG. 2 shows a vertical sectional view of the power unit 1 as viewed from the left side. Terms modified by front, rear, right and left, are used for indicating positions, sides and parts on the front, rear, right and left sides, respectively, of the vehicle provided with the power unit. As shown in FIG. 2, the power unit 1 includes a front internal combustion engine 16 and a transmission 17 extending toward the rear from the left side of the internal combustion engine 16. The transmission 17 includes a V-belt drive continuously variable transmission 18 and a reduction gear 19.

The internal combustion engine 16 is a rocker arm type, water-cooled, four-stroke cycle, overhead valve, single-cylinder internal combustion engine. An intake pipe 20 has one end connected to an intake port formed in an upper part of a cylinder head 25 and the other end connected to a throttle body 21. The air cleaner 11 (FIG. 1) is connected to the inlet end of the throttle body 21 at a position rearward of the throttle body 21. A fuel injection valve 22 is connected to the intake pipe 20. A gear case breather hose 39 is extended from an upper part of a gear case 38 and is connected to the intake chamber of the air cleaner 11. A speed sensor 49 is connected to an upper part of the gear case 38. The speed sensor 49 senses the tip speed of a gear 48 (FIG. 3) mounted on the rear axle 9 to determine a vehicle speed.

Figure 3:
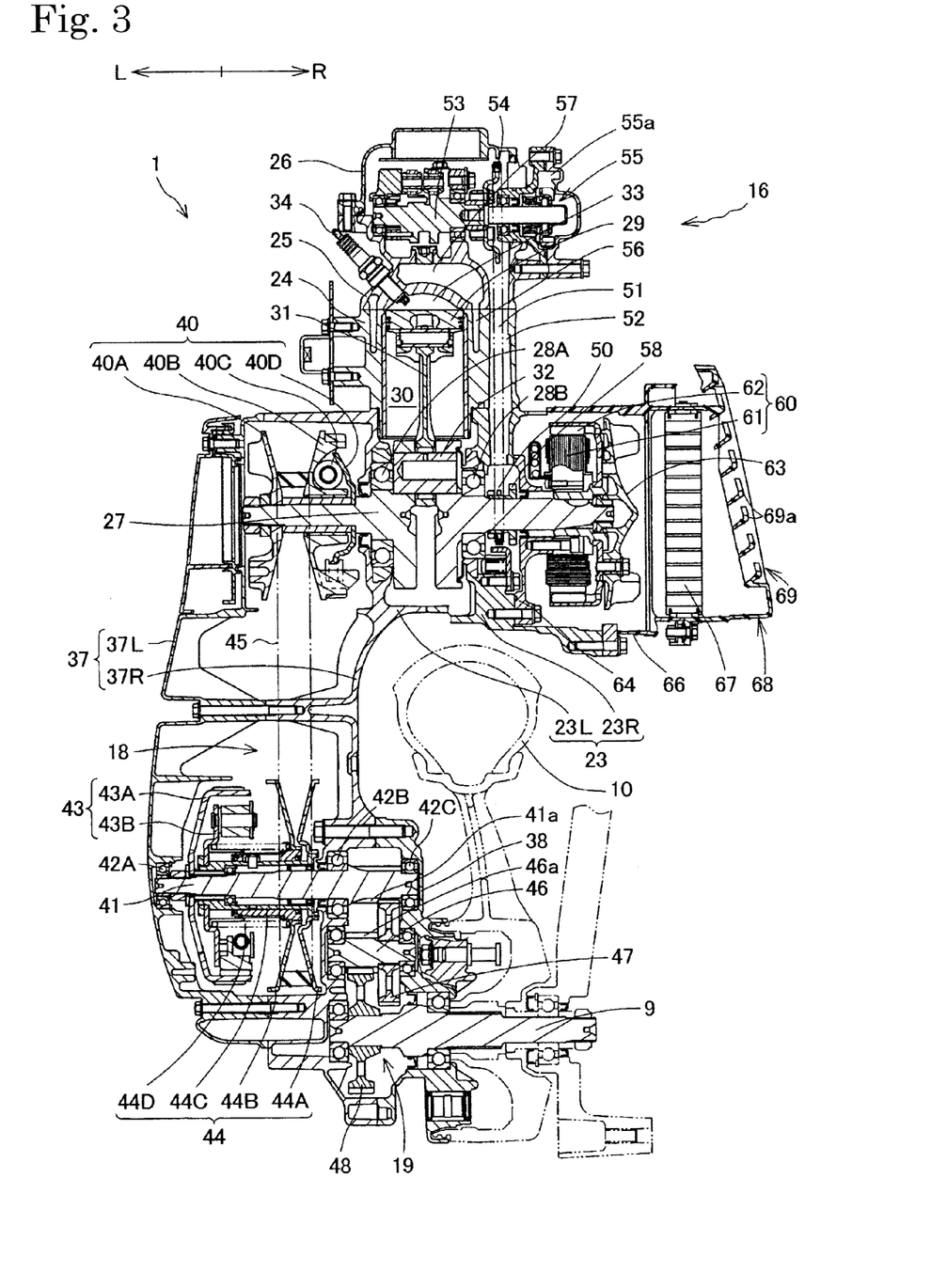
FIG. 3 is a sectional view taken on the line III-III in FIG. 2.

FIG. 3 shows a sectional view taken on the line III-III in FIG. 2. Referring to FIG. 3, the engine body of the internal combustion engine 16 is built by connecting a cylinder block 24 to the front end of a crankcase 23, connecting a cylinder head 25 to the front end of the cylinder block 24, and putting a cylinder head cover 26 on the cylinder head 25. The crankcase 23 is formed by joining together a left half crankcase 23L and a right half crankcase 23R.

A crankshaft 27 is supported for rotation in ball bearings 28A and 28B supported on the crankcase 23. A piston 29 is slidably fitted in a cylinder bore 30 formed in the cylinder block 24. The piston 29 is connected to the crankpin 32 of the crankshaft 27 by a connecting rod 31. The piston 29 reciprocates to drive the crankshaft 27 for rotation. A combustion chamber 33 is formed in the bottom surface of the cylinder head 25 opposite to the top surface of the piston 29. A spark plug 34 is attached to the cylinder head 25 such that the axis thereof is tilted to the left with respect to the center axis of the cylinder bore 30.

As shown in the left half of FIG. 3, the V-belt drive continuously variable transmission 18 is covered with a transmission case 37. The transmission case 37 has a right half transmission case 37R and a left half transmission case 37L. The right half transmission case 37R and the left half transmission case 37L are joined together. The right half transmission case 37R and the left half transmission case 37L are fastened together with bolts. The reduction gear 19 is covered with a rear part of the right half transmission case 37R and the gear case 38. The gear case 38 is fastened to the right half transmission case 37R with bolts.

The crankshaft 27 serves as the drive shaft of the V-belt drive continuously variable transmission 18. A drive pulley 40 included in the V-belt drive continuously variable transmission 18 is mounted on a left part of the crankshaft 27. A driven shaft 41 is supported for rotation in bearings 42A, 42B and 42C supported on the left half transmission case 37L, the right half transmission case 37R and the gear case 38. A driven pulley 44 is interlocked with the driven shaft 41 by a centrifugal clutch 43 mounted on the driven shaft 41. An endless V-belt 45 is extended between the drive pulley 40 and the driven pulley 44.

As the rotational speed of the crankshaft 27 increases, weight rollers 40C placed in a space between a movable half part 40B and a ramp plate 40D of the drive pulley 40 are moved outward by centrifugal force and the movable half part 40B is pushed toward a fixed half part 40A of the drive pulley 40 to increase the working pitch diameter of the drive pulley 40 and tensile stress induced in the V-belt 45 increases. Consequently, a movable half part 44B of the driven pulley 44 is moved against the resilience of a coil spring 44D, the distance between a fixed half part 44A and the movable half part 44B of the driven pulley 44 increases and the working pitch diameter of the driven pulley 44 is diminished. The rotational speed of the driven pulley 44 increases when the ratio of the working pitch diameter of the drive pulley 40 to that of the driven pulley 44 is thus increased. Upon the increase of the rotational speed of the driven pulley 44 beyond a predetermined rotational speed, the rotation of the driven pulley 44 is transmitted through a rotating sleeve 44C to the inner clutch part 43B of the centrifugal clutch 43, the inner clutch part 43B is engaged with an outer clutch part 43A. Thus, the centrifugal clutch 43 is engaged and the rotation of the driven pulley 44 is transmitted to the driven shaft 41.

The driven shaft 41 serves also as the input shaft of the reduction gear 19. The rear axle 9 united with the rear wheel 10 is supported for rotation on the right half transmission case 37R and the gear case 38A. An intermediate shaft 46 disposed between the driven shaft 41 and the rear axle 9 is supported for rotation on the right half transmission case 37R and the gear case 3. The torque of the driven shaft 41 is transmitted through a drive pinion 41a, an intermediate gear 47, the intermediate shaft 46, an intermediate pinion 46a and a rear axle gear 48 to the rear axle 9. The rotational speed of the rear axle 9 is far lower than that of the driven shaft 41 to drive the rear wheel 10 on the rear axle 9 at a reduced rotational speed.

As shown in the right half of FIG. 3, a camshaft driving sprocket 50 is mounted on a part of the crankshaft 27 adjacent to the ball bearing 28B. A camshaft sprocket 54 is mounted on a camshaft 53 disposed in a space defined by the cylinder head 25 and the cylinder head cover 26. A timing chain 51 is extended between the camshaft driving sprocket 50 and the camshaft sprocket 54 in a chain chamber 52. A water pump 53 is connected to one end of the camshaft 53. When the crankshaft 27 rotates, the water pump 53 pushes out the cooling water through a pump outlet 55a and forces the cooling water through a water jacket 56 formed in the cylinder block 24 and a water jacket 56 formed in the cylinder head 25 into the radiator 67. A balancer driving gear 58 is disposed adjacently to the camshaft driving sprocket 50.

An alternator 60 having a stator 61 and a rotor 62 is mounted on a right part of the crankshaft 27. The stator 61 is fixedly attached to an alternator mount 64 attached to the right half crankcase 23R. The rotor 62 is fixedly mounted on a right part of the crankshaft 27 for rotation together with the crankshaft 27. A centrifugal fan 63 is attached to the outer surface of the rotor 62. The centrifugal fan 63 draws fresh air through the radiator 67 to promote cooling the radiator 67.

The radiator 67 is attached to a radiator holding member 66 attached to the right half crankcase 23R on the right side of the centrifugal fan 63. The radiator 67 is covered with a radiator cover 68 for guiding cooling air to the radiator 67. The radiator cover 68 is disposed on the right side of the radiator 67. The radiator cover 68 is provided with a louver 69 having parallel slats 69a. The slats 69a forming the louver 69 are formed such that a rear part of the louver 69 with respect to the vehicle running direction is gradually more protruded laterally outward of the vehicle than a front part thereof. Thus, a headwind coming from the front of the vehicle can efficiently be guided to the radiator 67 to improve the efficiency of cooling the internal combustion engine.

Figure 4:
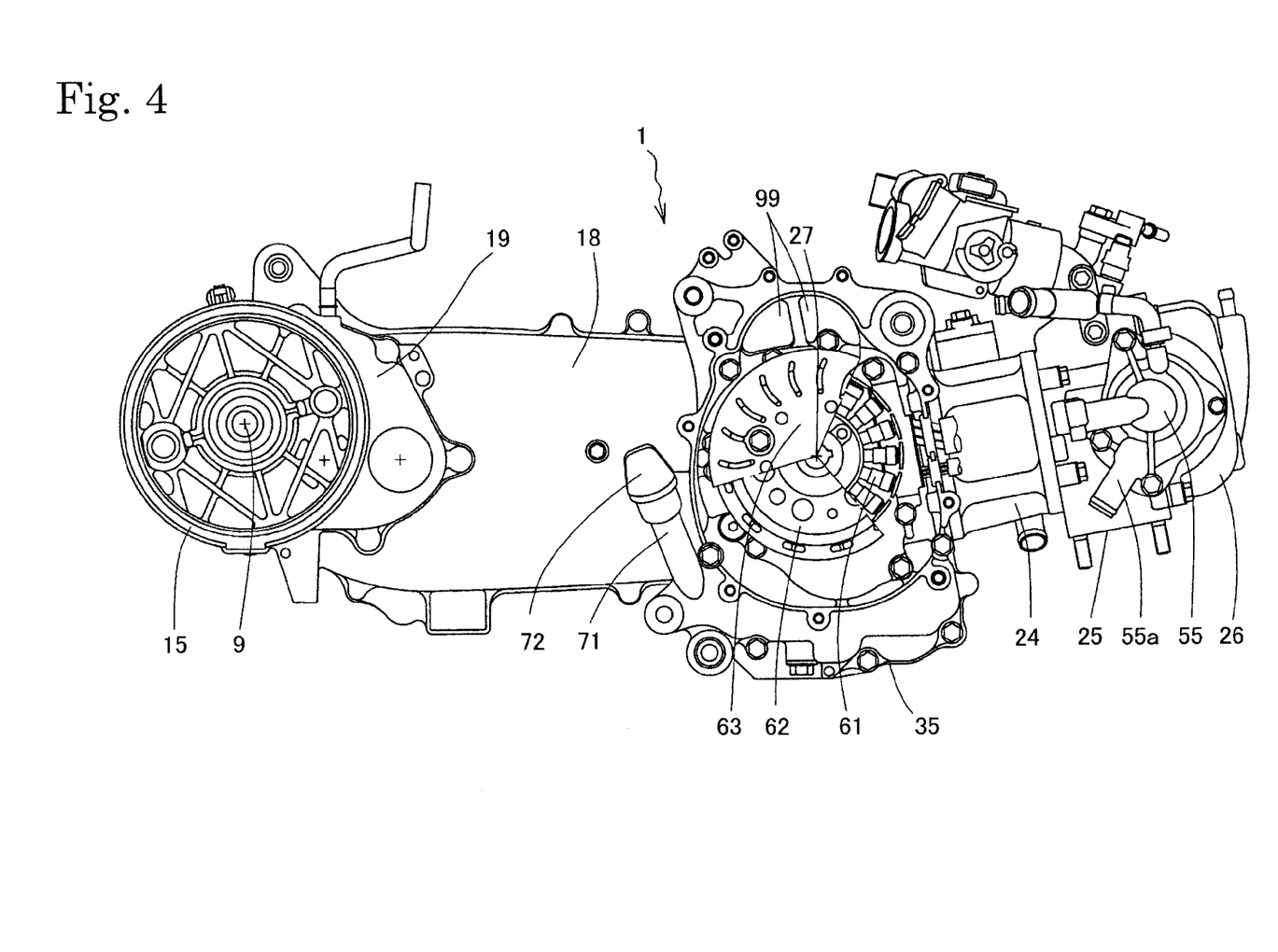
FIG. 4 is a right side elevation of the power unit 1, in which a radiator 67 and a radiator cover 68 are removed.

FIG. 4 is a right side elevation of the power unit 1, in which the radiator 67 and the radiator cover 68 are removed. A space around the right end of the crankshaft 27 is divided into three divisions and the stator 61 and the rotor 62 of the alternator and the centrifugal fan 63 are shown, respectively, in those divisions. The stator 61 of the alternator 60 is at the innermost position, the centrifugal fan 63 is at the outermost position and the rotor 62 of the alternator 60 is at the middle position. Cooling air drawn into an alternator chamber holding the alternator 60 by the radiator cooling fan 63 is sent outside through cooling air outlet openings 99 formed in an upper part of the alternator chamber and a cooling air outlet opening, not shown, formed in a lower part of the alternator chamber.

An oil pan 35 (FIG. 4) is attached to the lower end of the crankcase 23. A tubular oil filler neck 71 (FIG. 5) for filling oil into the crankcase 23 is extended obliquely rearward from the oil pan 35. An oil filler cap 72 is put on the oil filler neck 71. A water pump 55 is disposed on the right side of the cylinder head 25 and the cylinder head cover 36. Piping connected to the water pump 55 will be described later. The V-belt drive continuously variable transmission 18 and the reduction gear 19 are disposed rearward of the crankshaft 27. The rear axle 9 is provided with an axle hub 15 to which the rear wheel is attached.

Figure 5:
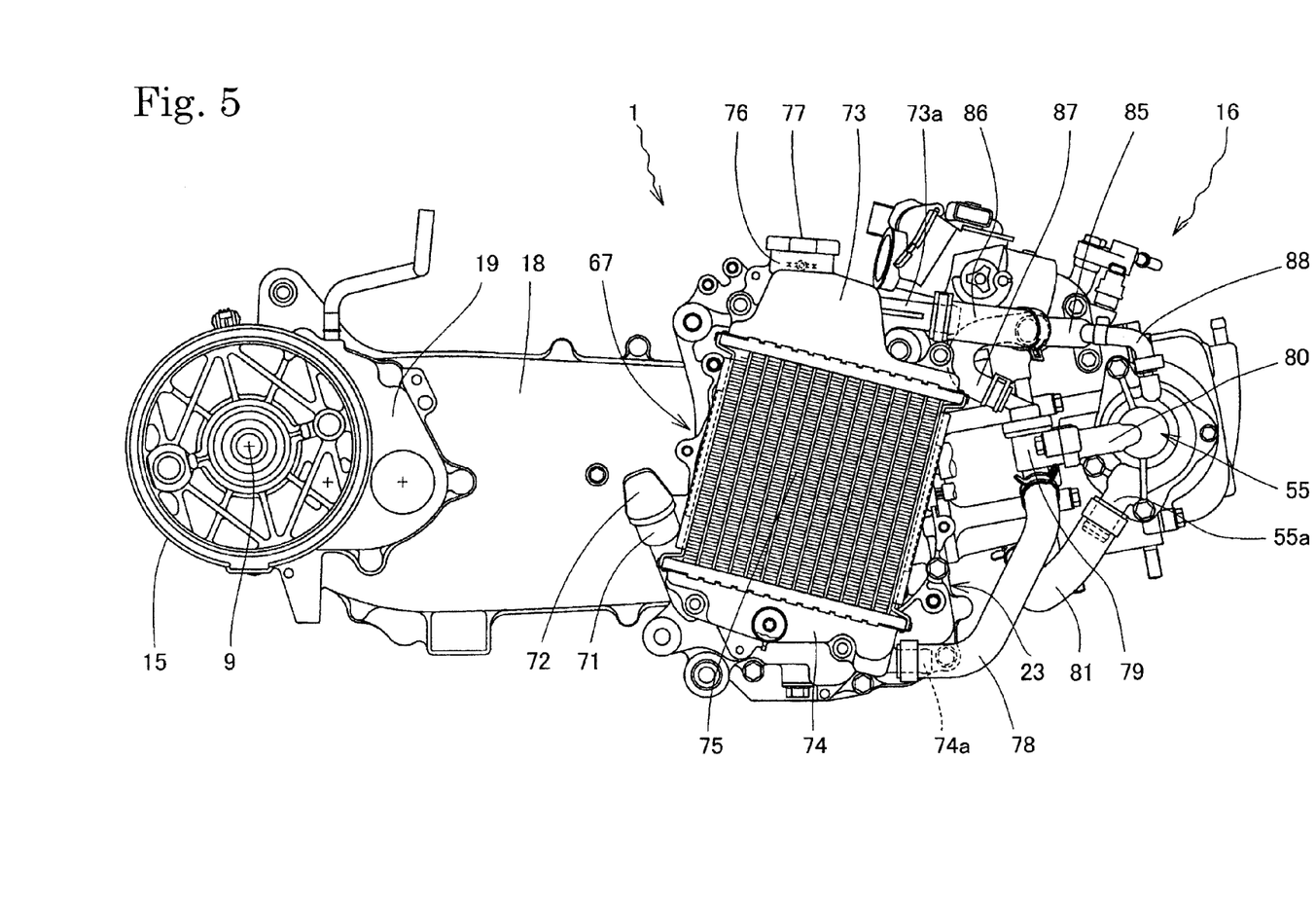
FIG. 5 is a right side elevation of the power unit 1 provided with the radiator 67 on the right side of a centrifugal fan 63.

FIG. 5 is a right side elevation of the power unit 1 provided with the radiator 67 on the right side of the centrifugal fan 63. The radiator 67 is on the front side of the oil filler neck 71. An upper water tank 73 and a lower water tank 74 are joined, respectively, to the upper and the lower end of the radiator 67. The radiator 67 is tilted forward as viewed from the side of the vehicle.

A cooling water inlet joint 73a and a cooling water outlet joint 74a are connected, respectively, to the upper water tank 73 and the lower water tank 74. Cooling water that has flowed through the cooling water inlet joint 73a into the upper water tank 73 flows through a radiator core 75 into the lower water tank 74. Cooling water is cooled while cooling water is flowing through the radiator core 75 by fresh air flowing across the radiator core 75, and cooled cooling water flows outside through the cooling water outlet joint 74a. The upper water tank 73 joined to the radiator 67 is provided with a water filler neck 76 and a water filler cap 77. The radiator 67 has a vertically long shape and the water filler neck 76 is connected to a rear part of the upper wall of the upper water tank 73. Therefore, air can easily be removed from the radiator 67 through the water filler neck 76 when water is filled into the upper water tank 73. Thus, facility of water filling work is improved.

Cooling water flowing out from the lower water tank 74 is circulated through the internal combustion engine 16 in the following manner. Cooling water discharged from the lower water tank 74 flows through the cooling water outlet joint 74a and a lower radiator hose 78 into a thermostatic selector valve 79. While the internal combustion engine 16 is in normal operation, cooling water is discharged from the thermostatic selector valve 79 and is sucked through a suction tube 80 into the water pump 55. Then, the water pump 55 discharges cooling water through the outlet 55a of the water pump 55 and sends cooling water through cooling water delivery hose 81 into the water jacket 56 (FIG. 3) of the cylinder block 24. The water jacket 56 of the cylinder block connects to the water jacket 57 (FIG. 3) of the cylinder head 25. Cooling water is heated to high temperature while cooling water flows through the water jackets 55 and 56 to cool the cylinder block 24 and the cylinder head 25. Cooling water thus heated is returned through a branch connecting pipe 85, an upper radiator hose 86 and the cooling water inlet joint 73a into the upper water tank 73. Cooling water flows through the foregoing circulation passage when the internal combustion engine 16 is in normal operation.

While the internal combustion engine 16 is in warm-up operation in which the engine 16 has not been properly warmed, the thermostatic selector valve 79 closes a valve in a passage through which cooling water from the lower water tank 74 and the lower radiator hose 78 flows and opens a valve placed in a passage through which cooling water from the branch connecting pipe 85 and a bypass hose 87 flows. Consequently, cooling water does not flow through the radiator and circulates through the water jackets 56 and 57. After the temperature of cooling water has sufficiently risen, the thermostatic selector valve 79 closes the passage connecting the bypass hose 87 and opens the water passage connecting to the lower water tank 74 to circulate cooling water normally for the normal operation.

Bubbles produced in the water pump 55 are sent through an air bleed hose 88 connected to an upper part of the water pump 55 to the branch connecting pipe 85. Then, the bubbles flow through the upper radiator hose 86 into the upper water tank 73. Bubbles, steam and surplus water resulting from thermal expansion are discharged through an overflow pipe 89 (FIG. 9(b)) connected to the upper water tank 73 and flow through an overflow hose to a reservoir tank (not shown) disposed at a low position below.

Figure 6:
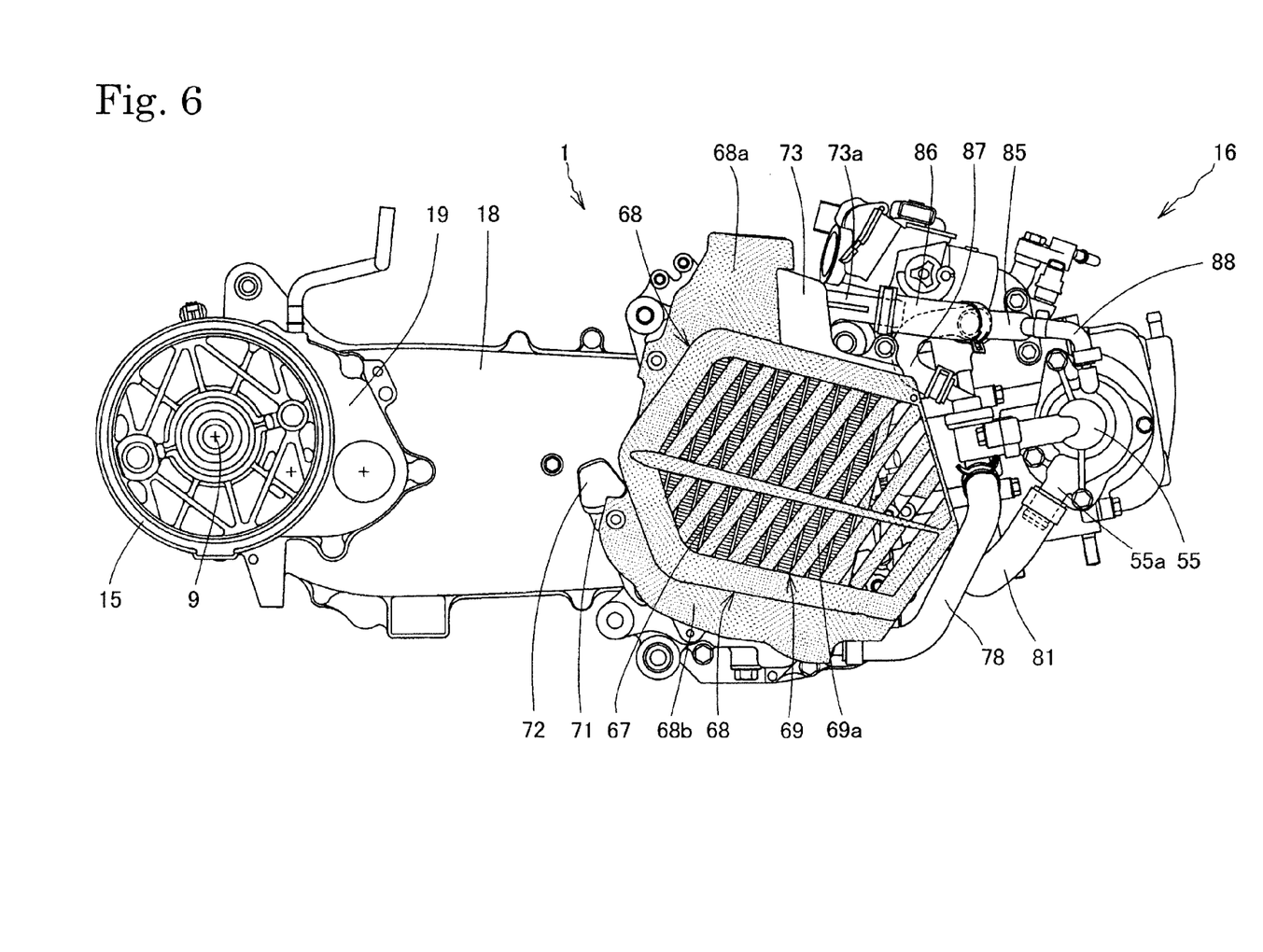
FIG. 6 is a right side elevation of the power unit 1 with the radiator cover 68 disposed on the right side of the radiator 67.

FIG. 6 shows a right side elevation of the power unit 1 with the radiator cover 68 disposed on the right side of the radiator 67. The louver 69 formed in the radiator cover 68 has the parallel slats 69a. The parallel slats 69a of the louver 69 are tilted or inclined forward of the vehicle.

Since the radiator 67 and the radiator cover 68 are formed in vertically long shapes, respectively, a wide space is available for oil filling work for filling oil through the oil filler neck 71 disposed behind. Since the radiator 67 is tilted forward, a wide space is made available over the oil filler neck 71 and hence oil filling work is facilitated.

Since the cooling water inlet joint 73a connected to the upper end of the upper water tank 73 projects forward, all the cooling water hoses including the upper radiator hose 86 can be arranged in a front space and do not obstruct water filling work for filling water through the water filler neck 76 projecting from the upper wall of the radiator.

Figure 7:
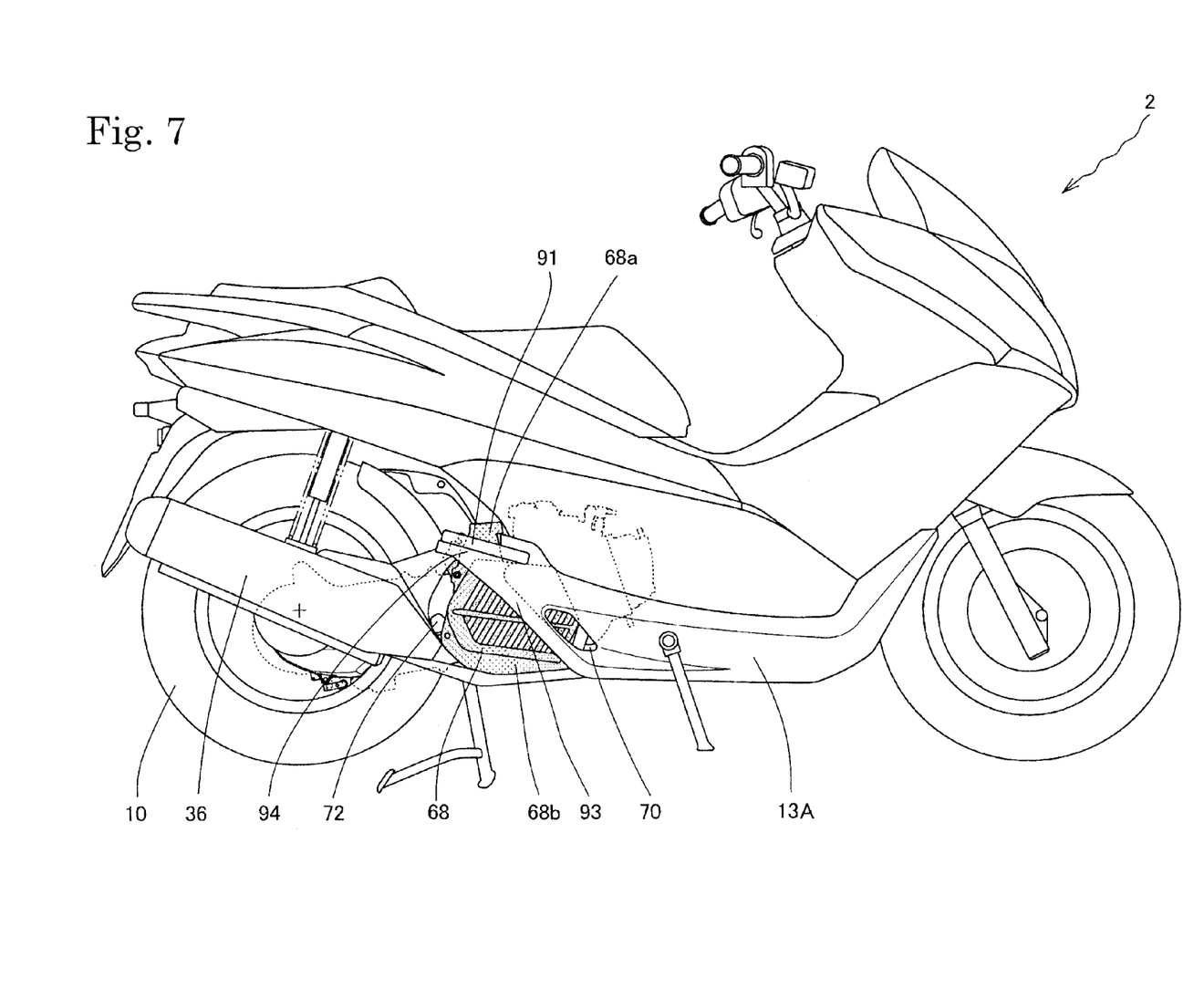
FIG. 7 is a right side elevation of the motorcycle 2 mounted with the power unit 1.

FIG. 7 is a right side elevation of the motorcycle 2 mounted with the power unit 1. The major part of the right half of the power unit 1 is covered with a lower body cover 13A and a half of the radiator cover 68 and the oil filler cap 72 are exposed to the outside. A muffler 36 is disposed on the right side of the rear wheel 10. The V-belt drive continuously variable transmission 18 and the reduction gear 19 included in a left half of the power unit 1 are screened from sight by the rear wheel 10. Although the lower body cover 13A does not have any part covering the oil filler neck 71, the oil filler neck 71 is covered with a rear part of the radiator cover 68.

A cooling air intake opening 70 is formed in a rear part of the lower body cover 13A to take in cooling air and send cooling air toward the louver positioned on the obliquely upper rear side thereof. The parallel slats 69a of the louver 69 formed in the radiator cover 68 are tilted forward to guide cooling air toward the radiator 67. The front edges of the slats are perpendicular to the flow of a head wind taken in through the cooling air intake opening 70. Thus, cooling effect of the radiator 67 is improved by the combined effect of the cooling air intake opening 70 formed in the lower body cover 13A and the louver 69. A front part of the radiator cover 68 is extended such that the front part of the radiator cover 68 and the cooling air intake opening 70 laterally overlap each other to protect the components on the front side of the radiator 67 from flying gravel coming through the cooling air intake opening 70 toward those components.

A pillion footstep 91 for a pillion passenger is attached to an upper rear part of the lower body cover 13A. The pillion footstep 91 and a stay, not shown, holding the pillion footstep 91 are high-strength members. Therefore, the pillion footstep 91 and the stay can protect the louver 69 from downward, external force that may act on the louver 69.

The pillion footstep 91 is supported at the front end thereof by a vertical pin and is able to turn outward on the pin so as to extend laterally. An upper part of the rear end of the lower body cover 13A, corresponding to the rear end of the folded pillion footstep 91 serves as a heel support 94. The heel of the shoe of a pillion passenger seated on the rear seat is supported on the heel support 94. A high-strength edge 93 (FIG. 8) having a U-shaped cross section is formed along the rear edge of the lower body cover 13A extending downward from a part supporting the heel support 94 to a part behind the cooling air intake opening 70. The high-strength edge 93 having a high strength can protect the louver 69 from external, lateral forces.

Figure 8:
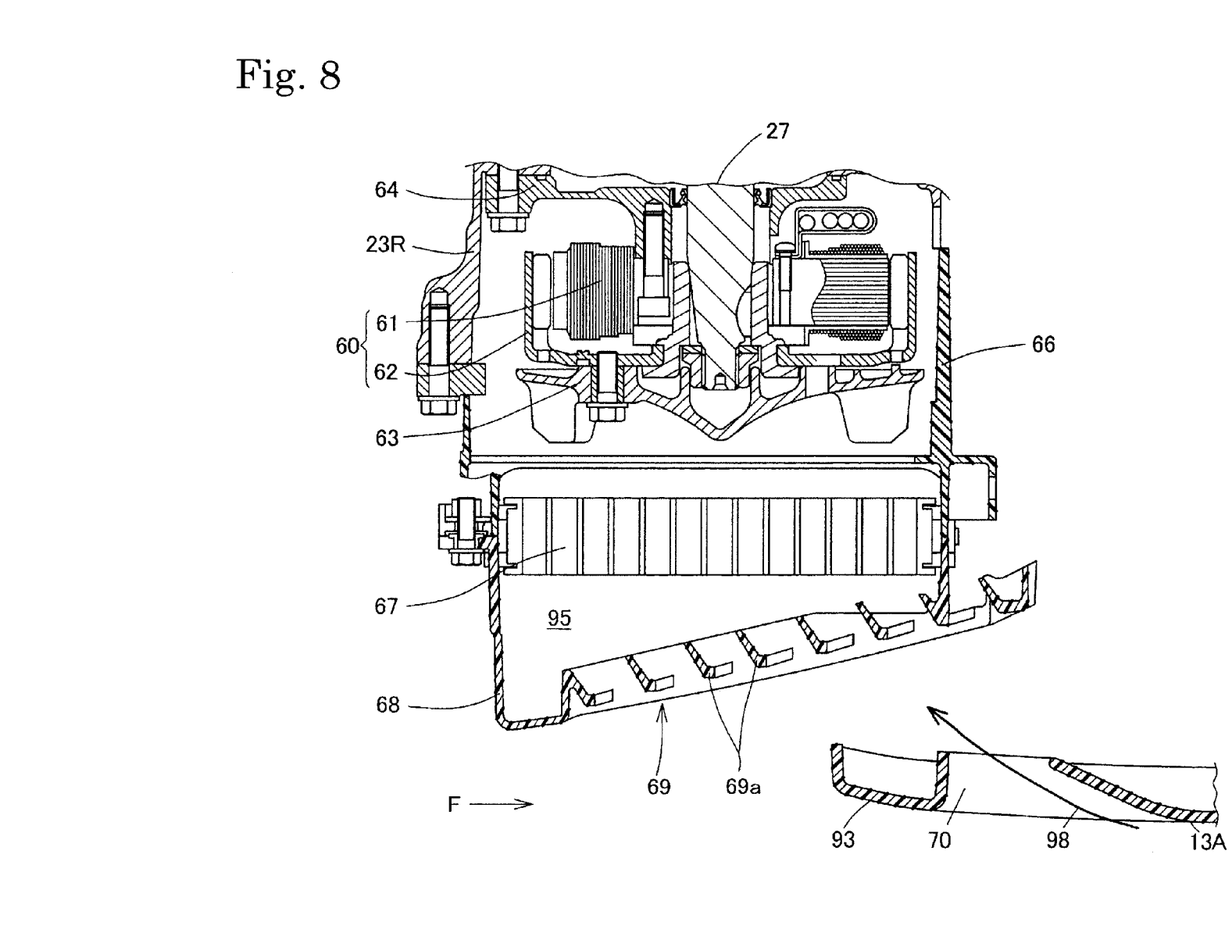
FIG. 8 is a top plan view of a right part of a crankcase.

FIG. 8 shows a horizontal sectional view for explaining the positional relation between a right part of the crankcase and a rear part of the lower body cover 13A. The rear edge 93 of the lower body cover 13A is a high-strength edge having the U-shaped cross section. A head wind 98 flows through the cooling air intake opening 70 toward the radiator cover 69, and then flows through the radiator cover 68 to the radiator 67. The radiator 67 and the radiator cover 68 are held on the right half crankcase 23R by the radiator holding member 66. An air flow deflecting space 95 is formed adjacent to a rear part of the radiator cover 68 between the radiator 67 and the radiator cover 68. The air flow deflecting space 95 is laterally wider than a space adjacent to a front part of the radiator cover 68. As the running speed increases, the head wind 98 gathered in a rear part of the space inside the radiator cover 68 can be effectively deflected toward the radiator 67, which improves cooling efficiency still further during the operation.

Figure 9:
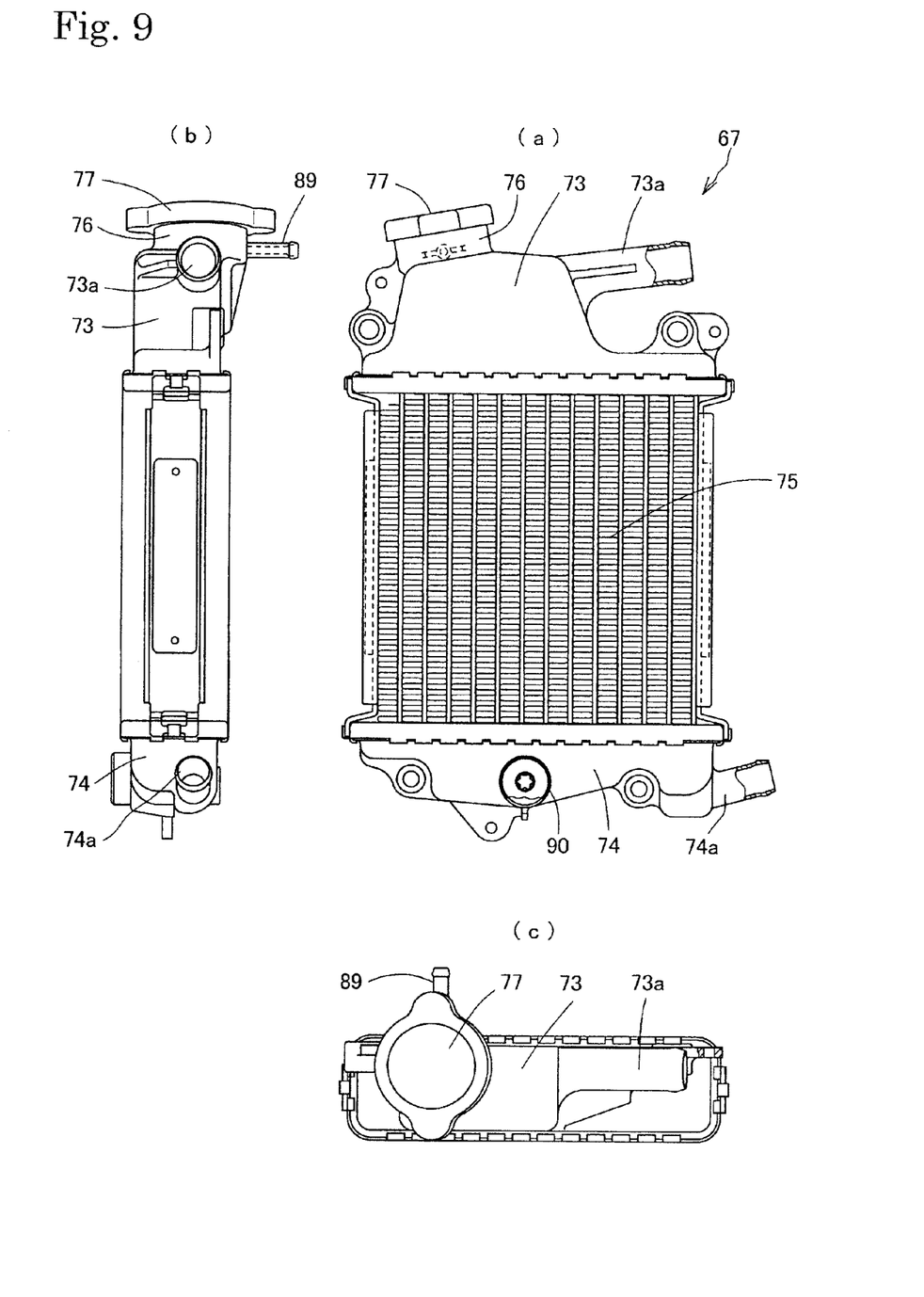
FIGS. 9(a), 9(b) and 9(c) are a right side elevation, a front elevation and a top plan view, respectively, of the radiator 67.

FIGS. 9(a), 9(b) and 9(c) are a right side elevation, a front elevation and a top plan view, respectively, of the radiator 67. The rectangular radiator core 75 forms a central part of the radiator 67. The upper water tank 73 and the lower water tank 74 are joined, respectively, to the upper and lower ends of the radiator core 75. The water filler neck 76 projects from the upper end of the upper water tank 73, and the filler cap 77 is put on the water filler neck 76. The cooling water inlet joint 73a projects forward from the front part of the upper water tank 73. The upper radiator hose 86 is connected to the cooling water inlet joint 73a. The overflow pipe 89 is connected to a left side part of the upper water tank 73. The overflow pipe 89 is connected to the reservoir tank (not shown) disposed at the low position below through an overflow hose. The cooling water outlet joint 74a projects forward from the front side of the lower water tank 74. The lower radiator hose 78 is connected to the cooling water outlet joint 74a. The lower water tank is provided with a drain port 90

Figure 10:
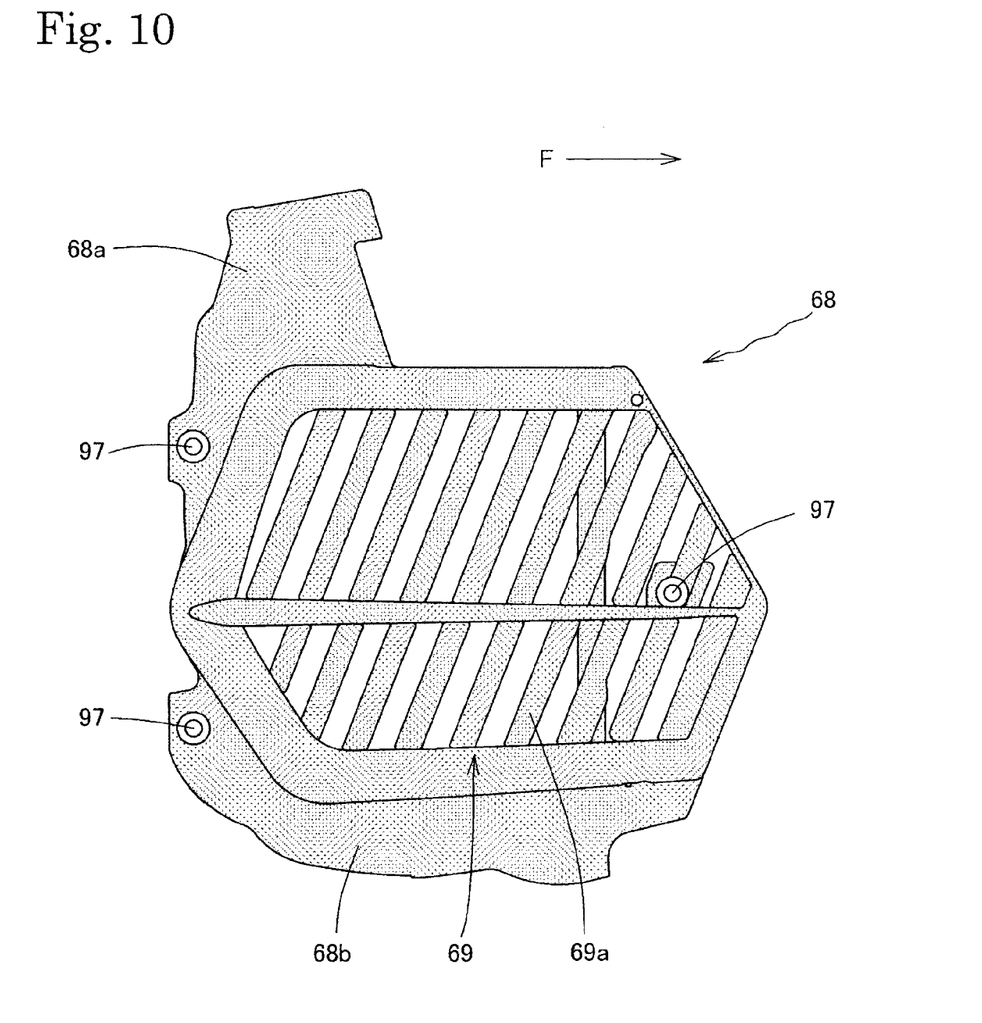
FIG. 10 is a side elevation of the radiator cover 68 showing the outer surface of the radiator cover 68.

FIG. 10 is a side elevation of the radiator cover 68, showing the outer surface of the radiator cover. As also shown in FIG. 6, a water filler neck protector 68a extends upward from an upper part of the radiator cover 68 on the outer side of the water filler neck 76. The water filler neck protector 68a covers and protects the water filler neck 76. As indicated in FIG. 7, the water filler protector 68a is positioned laterally inward of the pillion step 91 and stops the pillion passenger's foot from moving to the water filler neck. Therefore, any member specially for preventing the pillion passenger's foot from moving to the water filler neck does not need to be provided on the inner side of the pillion footstep 91.

A lower water tank protector 68b extends from a lower part of the radiator cover 68. The lower water tank protector 68b protects the lower water tank 74 from being damaged by flying gravel coming from the road surface. The radiator cover 68 is provided with three bolt holes 97 in a front and two rear parts thereof. As shown in FIGS. 6 and 7, the lower water tank protector 68b protects the oil filler neck 71 also.

Figure 11:
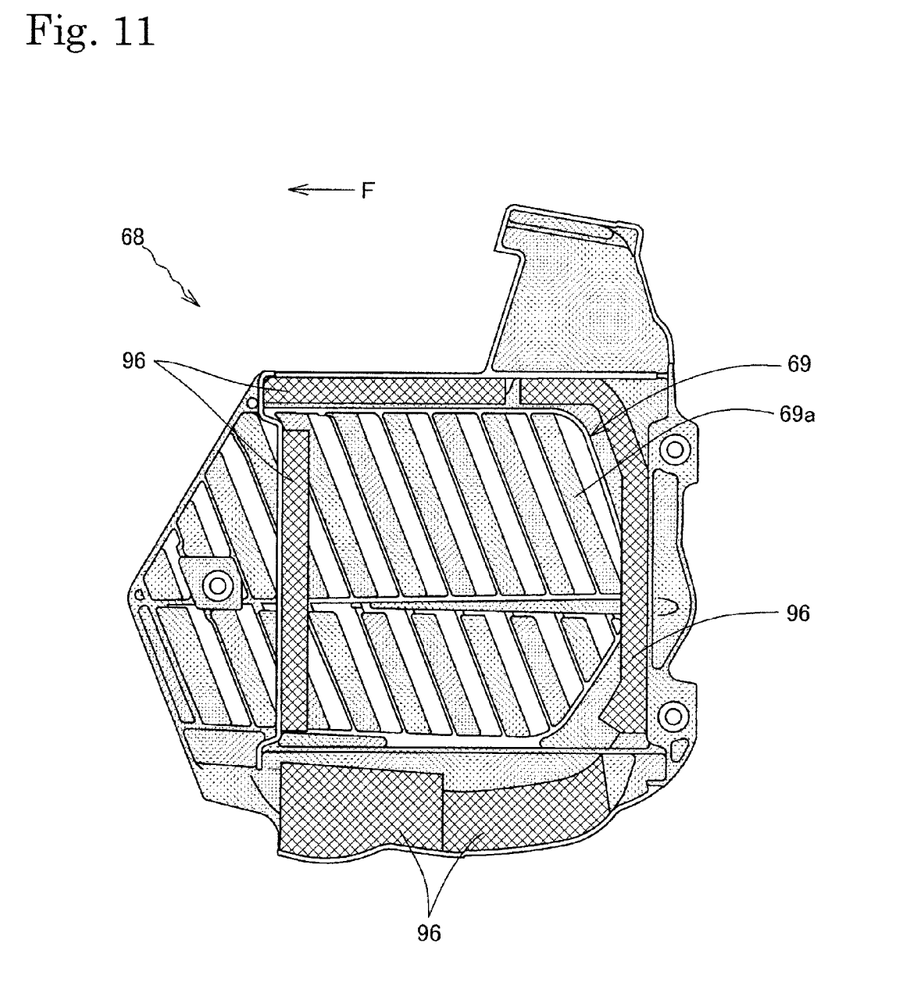
FIG. 11 is a side elevation of the radiator cover 68, showing the inner surface of the radiator cover 68.

FIG. 11 is a side elevation of the radiator cover 68, showing the inner surface of the radiator cover 68. Sealing members 96 are arranged on the inner surface of the radiator cover 68 so as to surround the radiator core 75. Thus, air, whose pressure rises in a space covered with the radiator cover 68 as the running speed increases, can be prevented from leaking and can be sent to the radiator 67. Consequently, cooling efficiency during operation can be improved. Vibratory noise caused by a head wind passing through the louver 69 can be reduced.

The embodiment described above has the following advantageous effects.

(1) The slats of the louver are formed such that a rear one of the slats with respect to vehicle running direction is more protruded laterally outward of the vehicle than a front one of the slats. Therefore, a head wind coming from the front of the vehicle can efficiently be guided to the radiator to improve the efficiency of cooling the internal combustion engine.

(2) Cooling efficiency can be improved by the combined effect of the cooling air intake opening formed in the body cover and the louver.

(3) The louver can be protected by the high-strength member attached to the body.

(4) The louver can be protected from downward, external forces that may act on the louver by the pillion footstep and the pillion footstep stay.

(5) The U-shaped rear edge of the body cover can prevent the louver from being deformed by lateral force that may act on the louver.

(6) A head wind gathered in the rear part of a space inside the radiator cover as the running speed increases can efficiently be deflected toward the radiator, which improves cooling efficiency during operation still further.

(7) Since the sealing members are arranged on the inner surface of the radiator cover so as to surround the radiator core, all air, whose pressure in the space on the inner side of the radiator cover increases as the running speed increases, can be sent to the radiator and hence cooling efficiency during operation can be improved still further. Further, vibratory noise caused by a head wind passing through the louver can be reduced.

(8) The oil filler neck is protected by the rear part of the radiator cover. The radiator is tilted forward to provide a wide space over the oil filler neck and hence oil filling work is facilitated.

(9) The water filler neck protector of the radiator cover prevents the pillion passenger's foot from moving to the water filler neck. Therefore, any member specially for preventing the pillion passenger's foot from moving to the water filler neck does not need to be placed on the inner side of the pillion footstep.

(10) Since the radiator and the radiator cover are formed in vertically long shapes, respectively, a wide working space can be formed around the oil filler neck in the rear. Since the cooling water inlet joint connected to the upper end of the upper water tank extends forward, all the cooling water hoses including the upper radiator hose can be arranged in a front space and a working space can be formed around the water filler neck on the upper part of the radiator. Since the radiator has the vertical long shape and the water filler neck is on the upper part of the radiator, air can be easily removed from within the water tank and hence water filling work can be facilitated.

The invention claimed is:

1. A radiator cooling structure for a water-cooled power unit of a small vehicle wherein a radiator is disposed on a laterally outer side of the small vehicle, characterized in that the radiator is provided with a radiator cover having a louver for guiding cooling air to the radiator, and the louver is formed such that a rearmost part thereof with respect to vehicle running direction is more protruded laterally outward of the vehicle relative to an outer surface of the radiator than a foremost part thereof, and
an airflow deflecting space is formed to extend between the radiator and the radiator cover, said air flow deflecting space being laterally wider in a rear part of the space than a front part of the space, to make the rear part of the space function as an air flow changing space.

2. The radiator cooling structure according to claim 1, wherein the louver of the radiator cover has parallel slats tilted forward, and there is provided a lower body cover formed with a cooling air intake opening for guiding a head wind toward the louver, the louver being positioned obliquely above and rearward of the cooling air intake opening.

3. The radiator cooling structure according to claim 2, wherein the louver is disposed on an inner side of a body member of the vehicle, with respect to the width of the vehicle.

4. The radiator cooling structure according to claim 3, wherein the body member includes a pillion footstep and a stay for the pillion footstep.

5. The radiator cooling structure according to claim 3, wherein the body member includes a reinforced part formed in a rear edge of the lower body cover to support a heel support thereon.

6. The radiator cooling structure according to claim 1, wherein sealing members are arranged on an inner surface of the radiator cover so as to surround a radiator core of the radiator.

7. The radiator cooling structure according to claim 1, wherein the radiator is disposed beside an end of a crankshaft of an internal combustion engine and on a front side of an oil filler neck of a crankcase, for filling oil into the crankcase, upper and lower water tanks are joined, respectively, to upper and lower ends of the radiator, and the radiator is tilted forward as viewed in a lateral direction.

8. The radiator cooling structure according to claim 2, wherein the radiator has a water filler neck formed integrally with an upper water tank, and the radiator cover has a water filler neck protecting part covering a side surface of the water filler neck and positioned on an inner side of a pillion footstep.

9. The radiator cooling structure according to claim 7, wherein the radiator and the radiator cover are formed in vertically elongated shapes, respectively, and a cooling water inlet joint is formed integrally with an upper end of the upper water tank so as to extend forward.

10. The radiator cooling structure according to claim 1, wherein a lower body cover is provided to laterally cover the radiator cover and the power unit, the lower body cover carrying a pillion footstep on an upper part thereof, and the lower body cover is formed with a cooling air intake opening for guiding a head wind toward the louver, in front of the pillion footstep.

11. The radiator cooling structure according to claim 10, wherein the cooling air intake opening partly overlaps a front portion of the radiator cover.

12. The radiator cooling structure according to claim 1, wherein the louver of the radiator cover has vertically oriented parallel slats, each of the slats being disposed such that a rear edge thereof is nearer to the radiator than a front edge thereof.

* * * * *